US006152519A

United States Patent [19]

Blank et al.

[11] Patent Number: 6,152,519

[45] **Date of Patent: *Nov. 28, 2000**

[54] DRIVE ARRANGEMENT FOR SLIDING DOORS IN MOTOR VEHICLES

[75] Inventors: Jörg Blank, Wolfsburg; Peter Rönitz, Gifhorn, both of Germany

[73] Assignee: Volkswagen AG, Wolfsburg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/250,383

[22] Filed: Feb. 12, 1999

[30] Foreign Application Priority Data

Feb. 18, 1998 [DE] Germany ........................... 198 06 762

[51] Int. Cl.[7] ........................................................ B60J 5/06

[52] U.S. Cl. ................................ 296/155; 49/213; 49/360

[58] Field of Search .............................. 296/155; 49/213, 49/360

[56] References Cited

U.S. PATENT DOCUMENTS

| | | | |
|---|---|---|---|
| 3,670,455 | 6/1972 | Salybaugh | 49/360 |
| 4,640,050 | 2/1987 | Yamagishi et al. . | |
| 4,932,715 | 6/1990 | Kramer | 296/155 |
| 5,046,283 | 9/1991 | Compeau et al. | 49/138 |
| 5,746,025 | 5/1998 | Shimura | 149/360 |
| 5,761,850 | 6/1998 | Lhotak et al. | 49/360 |
| 5,853,897 | 12/1998 | Sukale | 49/360 X |
| 5,896,704 | 4/1999 | Neag et al. | 49/155 X |

*Primary Examiner*—D. Glenn Dayoan
*Assistant Examiner*—Lori L. Coletta
*Attorney, Agent, or Firm*—Baker Botts L.L.P.

[57] ABSTRACT

A drive arrangement roller for a motor vehicle sliding door includes a guide rail, a drive reel, a carriage, a pair of cables extending from the drive reel to the roller carriage and a return roller all of which are assembled in a module which is attached to the outside of a vehicle wall. A plug-in connection to a drive motor inside the vehicle wall is provided by a drive shaft for the drive reel.

7 Claims, 7 Drawing Sheets

DRIVE ARRANGEMENT FOR SLIDING DOORS IN MOTOR VEHICLES

BACKGROUND OF THE INVENTION

This invention relates to drive arrangements for sliding doors in motor vehicles.

U.S. Pat. No. 4,932,715 discloses a drive arrangement for sliding doors of motor vehicles in which only the drive motor unit is located inside the wall of the vehicle. This provides an advantage over the arrangement described in U.S. Pat. No. 5,746,025, in which drive cables which serve as force transmission members must be passed through openings in the vehicle wall since it requires only a single, easily sealed opening in the wall for passage of the drive shaft.

In the context of the present invention, a drive motor unit is understood to mean any unit containing at least one drive motor. As a rule, however, the drive motor is followed by a transmission and a safety clutch and that combination is referred to herein as a "drive motor unit".

The above-mentioned disadvantage of the arrangement in U.S. Pat. No. 5,746,025, i.e. the need to thread drive cables through openings in the vehicle wall, is also present in the arrangement described in U.S. Pat. No. 5,046,283, which incidentally employs a cable roller having two winding zones.

A common feature of the prior art arrangements discussed above is that they do not meet the requirements for a modern vehicle installation with preassembled modules.

SUMMARY OF THE INVENTION

Accordingly, it is an object of the present invention to provide a drive arrangement for sliding doors in motor vehicles which overcomes the disadvantages of the prior art.

Another object of the invention is to provide a motor vehicle sliding door drive arrangement which is especially installation-friendly with no additional cost while preserving the advantages of the prior art.

These and other objects of the invention are attained by providing a motor vehicle sliding door arrangement in which all of the drive components outside the vehicle wall, including a drive wheel, and return roller, a tensioning device and a force transmission member are combined with the guide rail in an assembly module having a plug-in connection with the motor drive shaft.

The invention thus avails itself of the fact that all components of the actuating arrangement except for the drive motor unit are on the outside of the wall. According to the invention, all of those components are combined as a preassembly by mounting them on the guide rail, which is, for example, to be affixed to the vehicle wall, with an effective coupling between the drive motor and a drive gear in the assembly module being made by plug-in connection with a drive shaft which would be required in any event. Thus, the invention preserves the fundamental advantage of the prior art since flexible force transmission members, such as cables, gear belts or the like, are located outside of the vehicle wall in question, and are consequently an integral part of the assembly module, so that holes through the wall, for example the body wall of a motor vehicle for the force transmission members, are not necessary. This results not only in a reduction of the cost and a reduction of the danger of entry of dirt or the like, but also in protection of the force transmission members, since they can easily be damaged by abrasion while passing through holes.

In a particular embodiment, one end of the guide rail is bent toward the vehicle wall on which the assembly is mounted and the return roller is attached at that end so that the point of attachment of the force transmission member, which is a boom projecting from the roller carriage, moves parallel to the guide rail during its travel motion including the terminal portion at the bent end. Thus, insofar as possible, the number of bends in the flexible force transmission members is reduced, making use of the fact that, except for the drive motor unit, all components of the arrangement are located outside of the vehicle wall, for example outside of the interior of the motor vehicle.

These measures may be employed to special advantage if the components of the arrangement that are located outside of the wall are combined into an assembly module as described above. In principle, however, it is also possible to use the specific individual components of the assembly to provide corresponding advantages. For example, the boom provided on the roller carriage ensures that the point of action of the power transmission member on the roller carriage will continue in its substantially linear path even when the roller carriage turns into a curved section of the guide rail.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
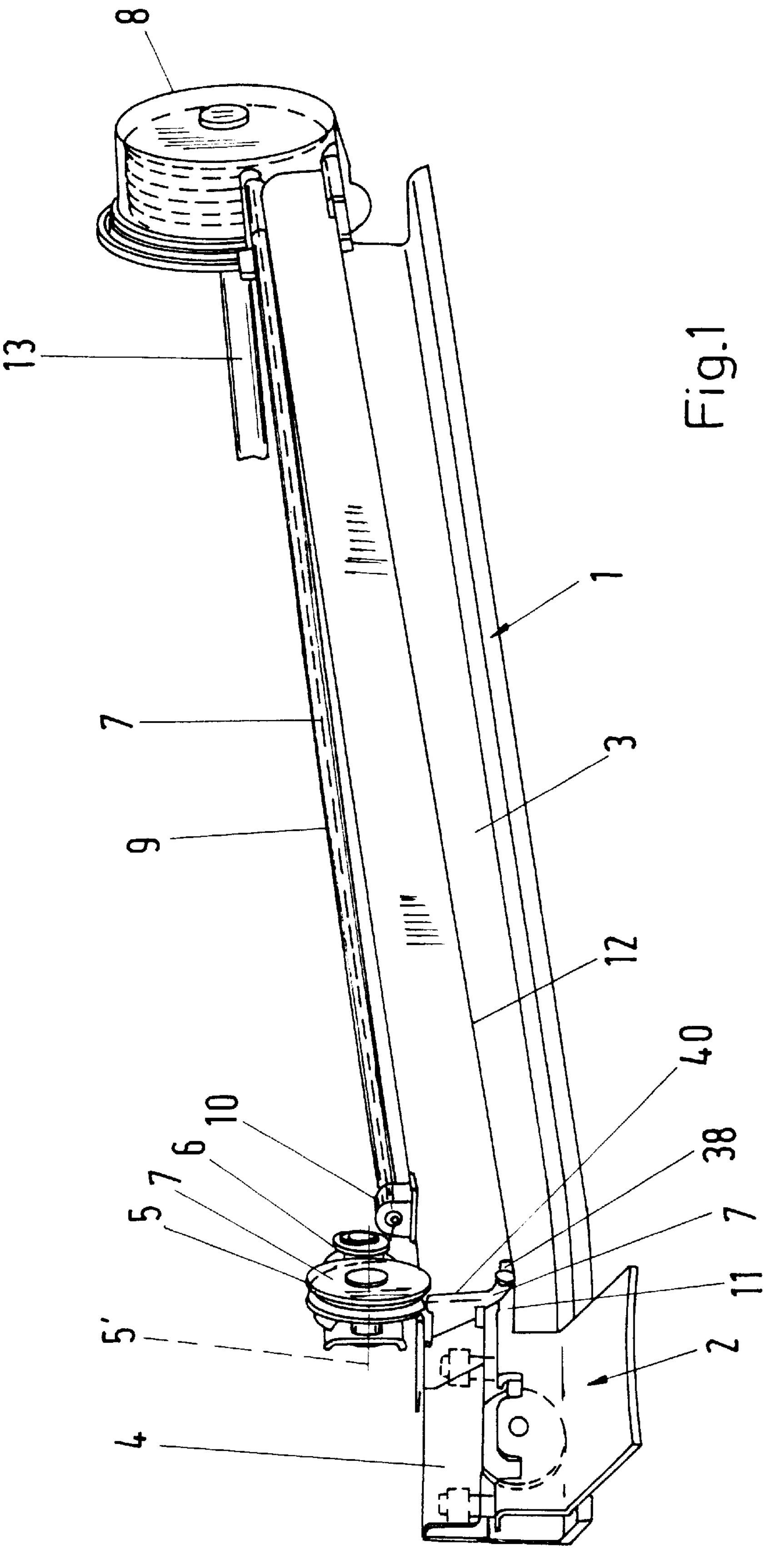
FIG. 1 is a perspective view showing a representative embodiment of an assembly module in accordance with the invention.
Figure 6:
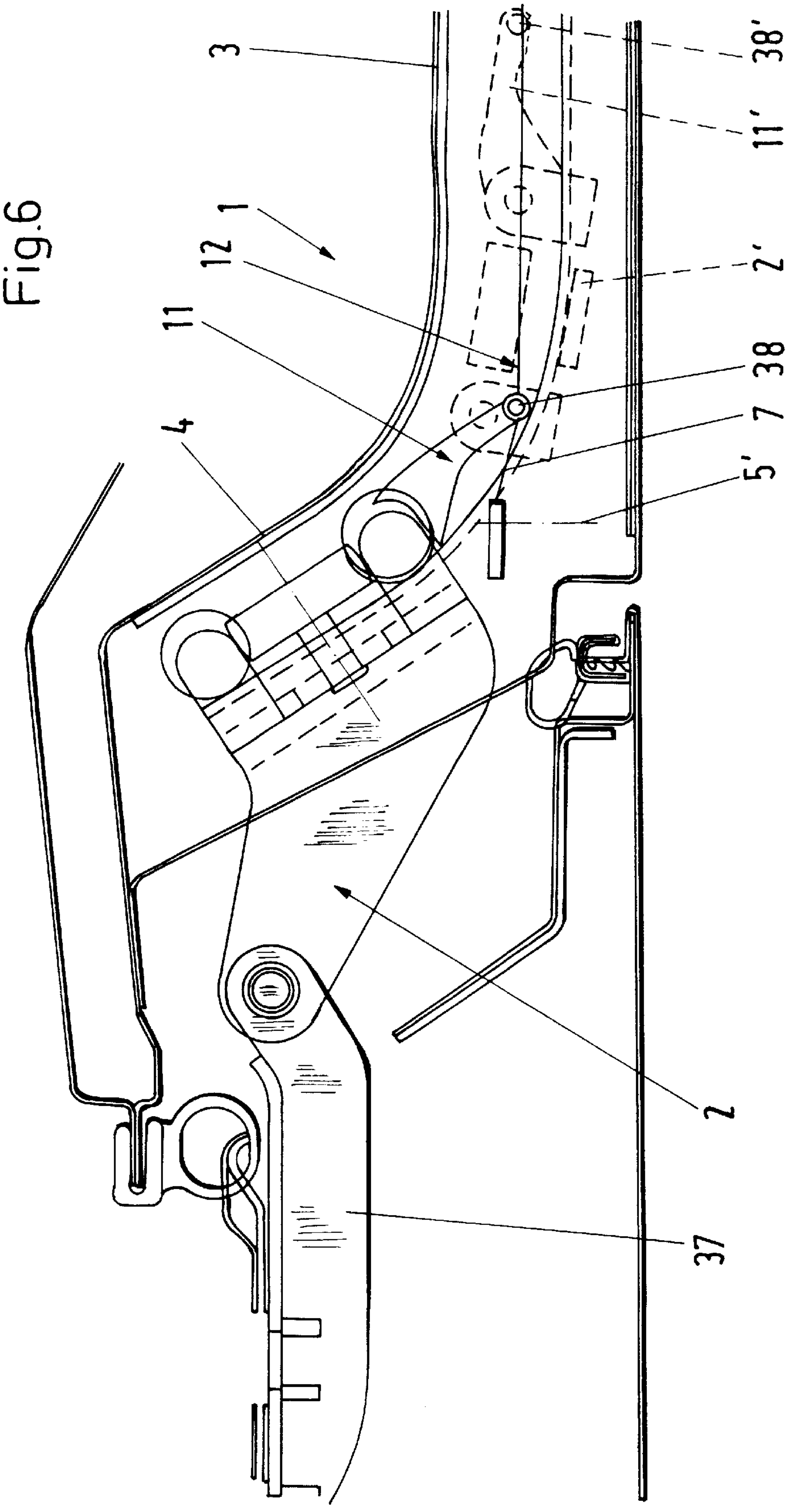
FIG. 6 is a sectional view taken along the line VI—VI of FIG. 2.

Referring first to FIG. 1, a typical assembly module for a motor vehicle sliding door drive arrangement according to the invention includes a guide rail 1 to guide a roller carriage 2 which, as will be explained with reference to FIG. 6, is connected to the sliding door of a motor vehicle. The guide rail 1 has a linear horizontal portion 3 and a terminal portion 4 which is bent toward the vehicle wall (not shown in FIG. 1). At the transition between the two portions 3 and 4 of the guide rail, a return roller 5 having a tensioning device 6 for a cable 7 is mounted on the guide rail 1. The cable 7 passes from a drive reel 8 in the form of a cable drum through protective tubing 9, which is also attached to the guide rail 1 at an end 10 by way of the return roller 5, and then passes downwardly, as seen in the drawings, to its point of attachment 38 to the roller carriage 2. To connect the carriage to the attachment point 38, the roller carriage 2 has a boom 11 extending rearwardly with respect to its direction of travel toward the terminal portion 4 of the guide rail. This assures that another cable 12, which constitutes an additional power transmission member connected to the boom 11, is always held linearly taut, since the end of the boom 11 extends parallel to the guide rail during the swinging motion of the roller carriage that occurs when the carriage enters the terminal portion 4 of the rail.

The cable 12 also extends from the drive reel 8, which preferably contains two axially adjacent winding zones for the two cables 7 and 12. Alternatively, however, only one winding zone may be provided on the drive reel 8 with that zone being cleared by unwinding of one of the cables so as to be utilized for winding of the other cable. The drive reel 8 is connected to a drive shaft 13 which, upon mounting of the module just described on the vehicle wall, makes a torque-transmitting plug-in connection with a drive motor unit not, shown in FIG. 1, on the other side of the wall. This assembly module is mounted on the vehicle in any conventional way, for example by a screw connection. Such mounting arrangements are well know to those skilled in the art so that no detailed description is necessary.

Figure 2:
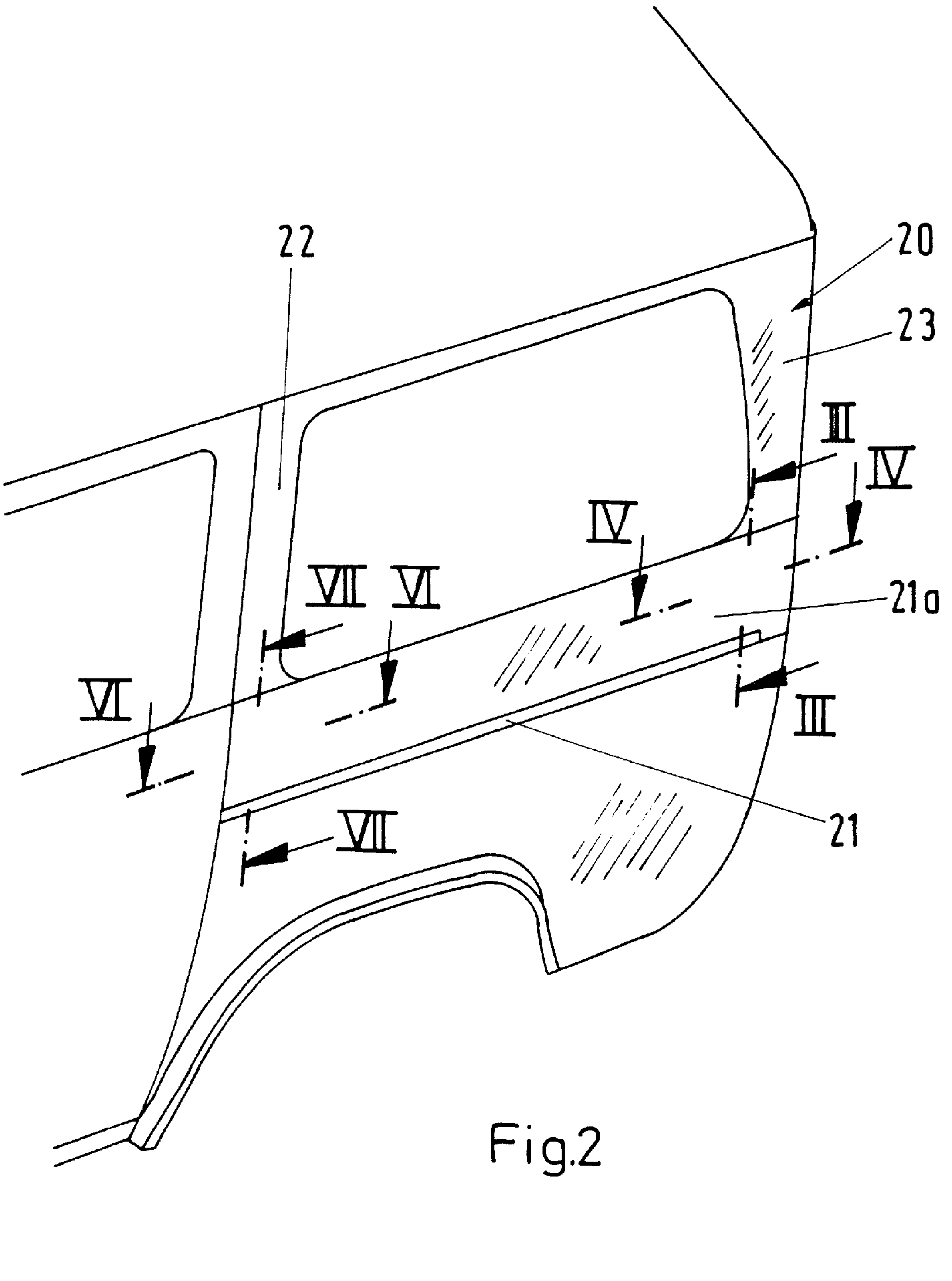
FIG. 2 is a perspective view illustrating the rear part of a van equipped with a sliding door.

FIG. 2 shows the rear part of a motor vehicle body 20 which includes a recessed portion 21 for mounting the module shown in FIG. 1 covered by a fairing 21 a. Of the portion of the vehicle body illustrated in FIG. 2 only the C-column 22 and D-column 23 are provided with reference numbers, since these columns appear in other figures.

In FIGS. 3–7 the reference numerals discussed above with reference to FIGS. 1 and 2 are retained to the extent appropriate.

Figure 3:
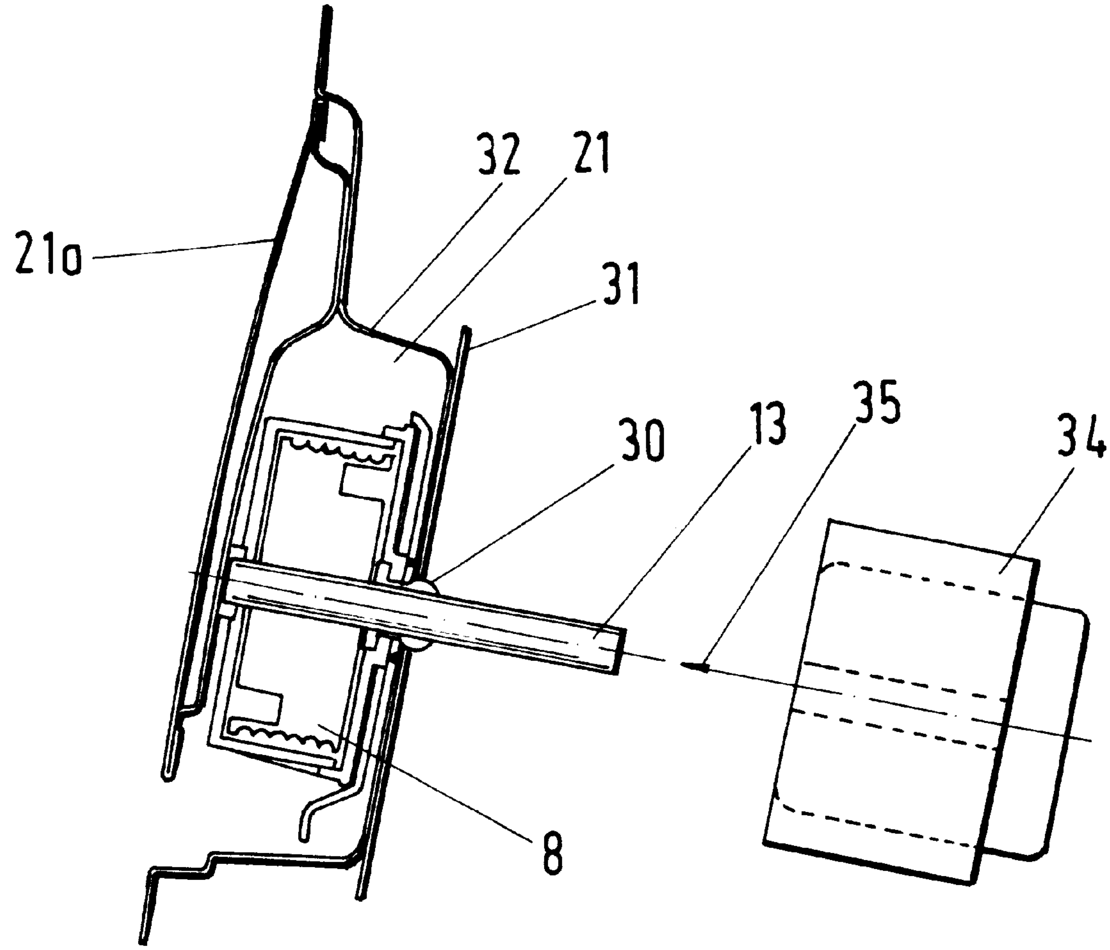
FIG. 3 is a sectional view taken along the line III—III of FIG. 2.

FIG. 3 shows the drive reel 8 and its drive shaft 13 passing through a journal box 30 mounted in an opening in inner and outer panels 31 an 32 of the vehicle body.

In addition, FIG. 3 shows the recessed portion 21 of FIG. 2 in which the assembly module is mounted according to the invention and which is covered by the fairing 21 a after installation of the module.

FIG. 3 also shows a drive motor unit 34 which includes, as discussed above, a clutch and a reducing gear in addition to an electric motor and its controls. This drive motor unit 34 is attached to the vehicle body on the inside and, upon introduction of the drive shaft 13 into a matching recess of the output shaft of the drive motor unit 34 having a corresponding cross-sectional profile, a torque-transmitting connection is made between the drive motor unit 34 and the drive reel 8. This plug-in connection is represented by the arrow 35 in FIG. 3.

Figure 4:
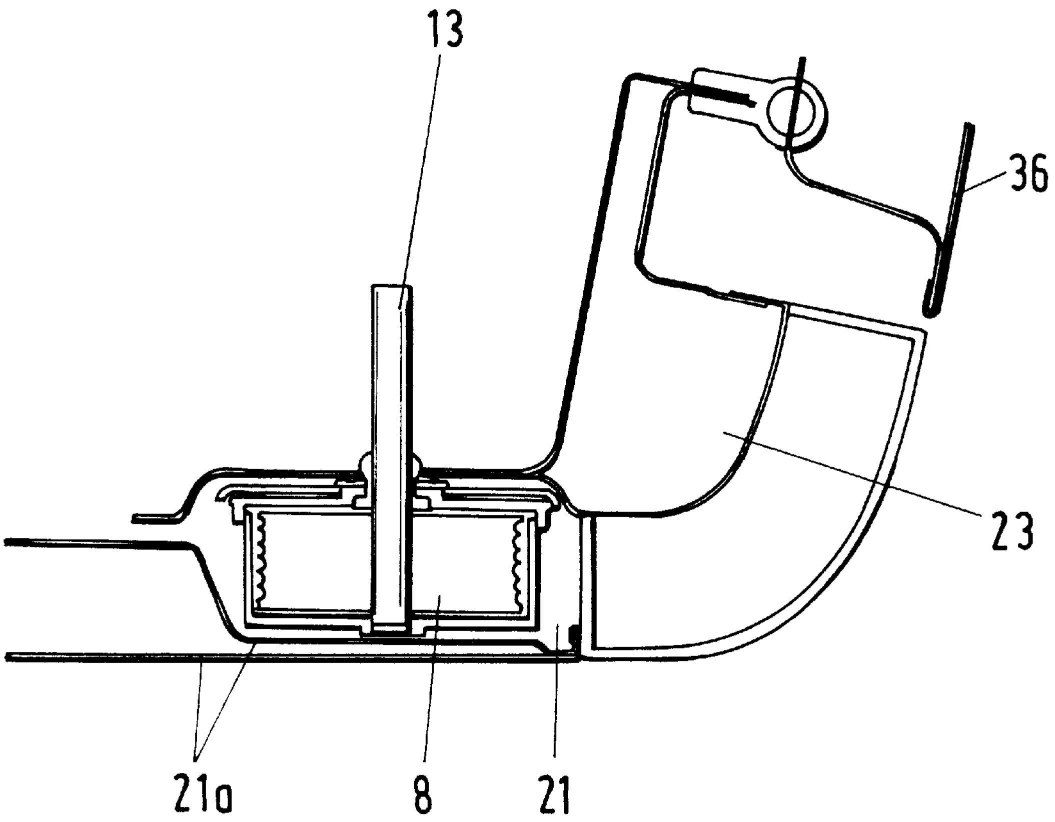
FIG. 4 is a sectional view taken along the line IV—IV of FIG. 2.

In FIG. 4 a hatchback 36 of the vehicle is illustrated alongside the D-column 23.

Figure 5:
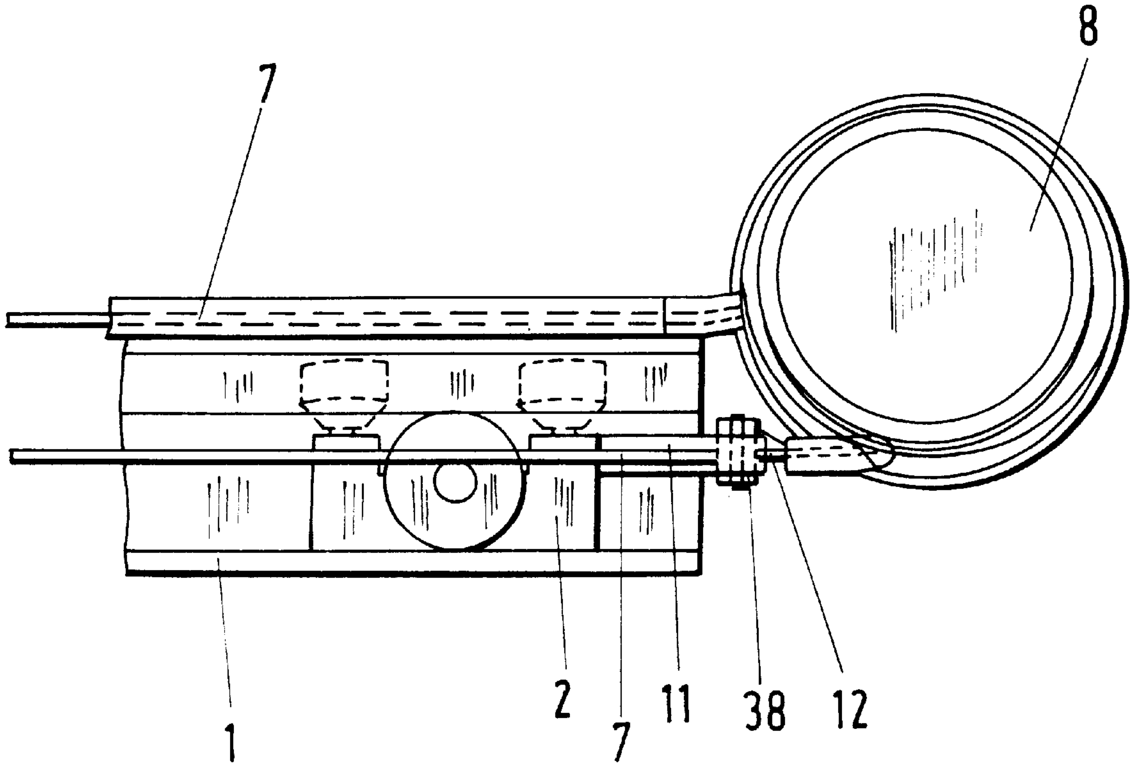
FIG. 5 is a fragmentary view illustrating a portion of the assembly module shown in FIG. 1 located in the vicinity of the D-column of the vehicle.

FIG. 5 shows the end of the assembly module according to the invention which is adjacent to the D-column. It is assumed in FIG. 5 that the roller carriage 2 has traveled away from the position as shown in FIG. 1 in which the sliding door, not shown, is closed, toward the right as viewed in FIG. 1 into the position in which the sliding door is wide open. This opening travel is produced by the cable 12 as it wound onto the drive reel 8 by counterclockwise rotation, as viewed in FIG. 5, to open the sliding door. The door is closed by the cable 7, which is unwound during the above-described opening travel of the door but, during closing of the door, is wound up by clockwise rotation of the drive reel 8, the drive motion being applied to the cable 7 by way of the return roller 5.

In FIG. 6 it is assumed that the roller carriage 2 is located in the same position as in FIG. 1.

In this illustration, the connection 37 of the roller carriage 2 to the sliding door is shown. This illustration also shows that the boom 11, providing the point of attachment 38 of the two cables 7 and 12, ensures a continuation of the substantially linear path of travel of the two cables 7 and 12 parallel to the guide rail 1 upon entry of the roller carriage 2 into the terminal portion 4 of the guide rail 1. Thus, as the carriage 2 moves to the left as viewed in FIG. 6 the boom 11 is somewhat extended so that the point of attachment 38 does not participate in the lateral motion of the roller carriage 2 away from the guide rail and toward the vehicle wall in the region 4.

The return roller 5 is represented in FIG. 6 only by its axis of rotation 5'.

In the right-hand part of FIG. 6 broken lines represent the positions 2' of the roller carriage and 11' of the boom as the carriage moves onto the linear portion of the guide rail from the position shown in solid lines in FIG. 6. This shows that in both positions of the carriage the positions 38 and 38' of the point of attachment of the two cables 7 and 12 lie on a line parallel to the linear portion 3 of the rail.

Figure 7:
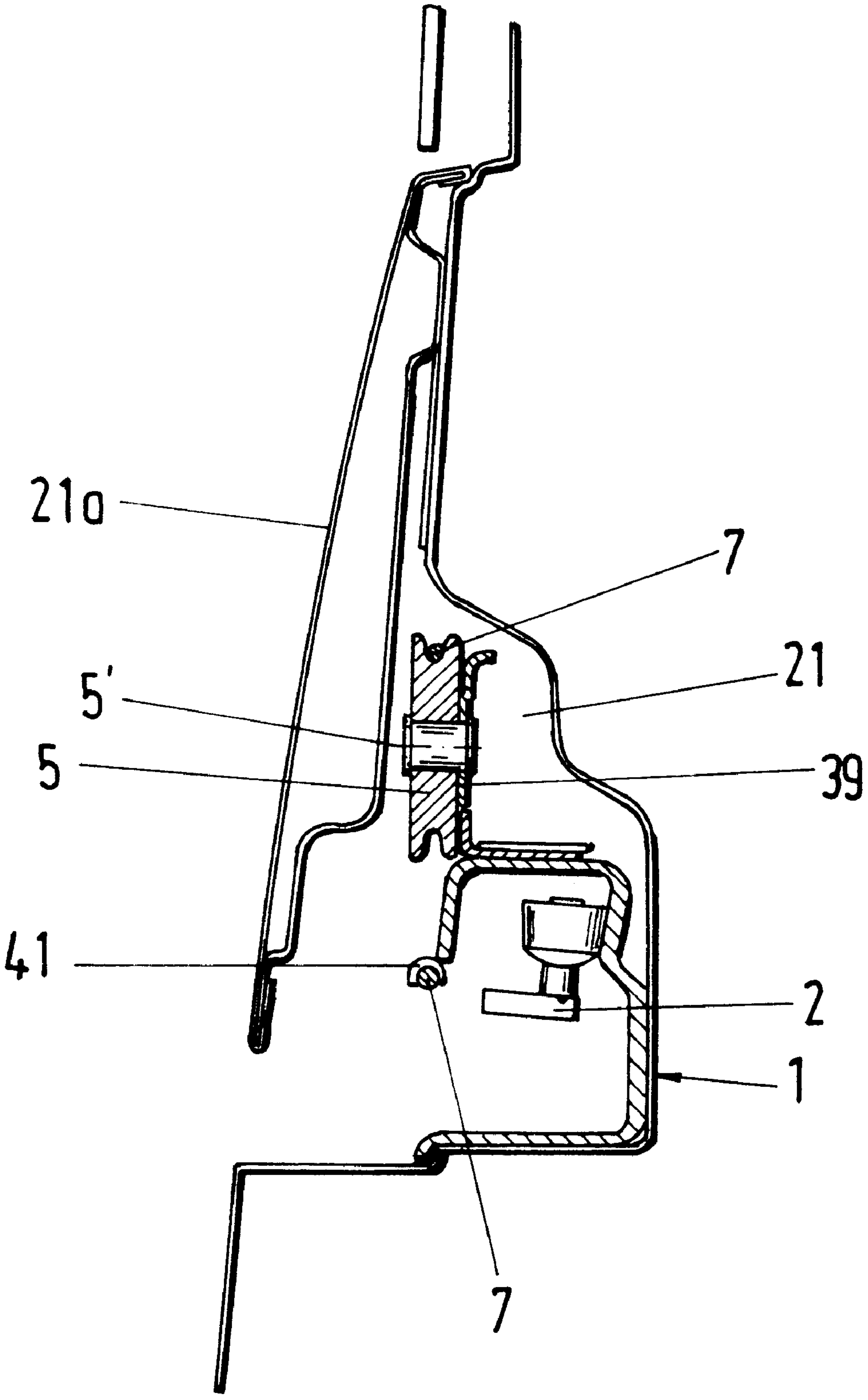
FIG. 7 is a sectional view taken along the line VII—VII of FIG. 2.

FIG. 7 shows that the return roller 5 is held vertically perpendicular to the guide rail by a mount 39. Much the same arrangement applies to the drive reel 8. The perpendicular orientation of the return roller 5 with its plane parallel to the general contour of the vehicle wall, as shown also in FIG. 1, has the result that the cable 7 need be bent in only one plane. This reduces deformation of the cable during operation of the sliding door to the absolute minimum required, thus protecting the cable and consequently assuring a long service life.

Preferably, the cables 7 and 12 are mounted in a protected manner. In this regard, the tubing 9 for the cable 7 has already been described with respect to FIG. 1. A similar protective guide 40 is provided underneath the return roller 5 as shown in FIG. 1. Another protective guide 41 for the cable 7, which is tub-like in cross-section, is shown in FIG. 7.

As the foregoing description of an embodiment of the invention demonstrates, the invention provides a motor vehicle sliding door drive arrangement that not only is especially installation-friendly, but also is designed with a view to long service life.

Although the invention has been described herein with reference to specific embodiments, many modifications and variations therein will readily occur to those skilled in the art. Accordingly, all such variations and modifications are included within the intended scope of the invention.

We claim:

1. A drive arrangement for a motor vehicle sliding door which, in the closed position, closes a door aperture in a vehicle wall and, in the open position, is in front of a portion of the vehicle wall comprising:

a guide rail for a sliding vehicle door extending in the direction of the sliding movement of a vehicle door;

a roller carriage movable on the guide rail to guide a sliding vehicle door along the guide rail;

a drive reel;

at least one flexible force-transmission member coupled to the drive reel;

at least one return roller and at least one tension device for tensioning the force-transmission member; and a drive motor unit adapted to be mounted inside a vehicle wall and to be drivingly connected to the drive reel by a drive shaft passing through a vehicle wall;

wherein the guide rail, the drive reel, the flexible force-transmission member and the return roller are combined in an assembly module adapted to be mounted outside a vehicle wall and to be connected to the drive motor unit by a plug-in connection between the drive motor unit and the drive shaft.

2. A drive arrangement according to claim 1 wherein the force-transmission member comprises at least one cable and the drive reel comprises a cable drum having a number of winding zones corresponding to the number of cables.

3. A drive arrangement for a motor vehicle sliding door which, in the closed position, closes a door aperture in a vehicle wall and, in the closed position, is in front of a portion of the vehicle wall comprising:

a guide rail for the sliding vehicle door extending in the direction of the sliding movement of a vehicle door;

a roller carriage movable on the guide rail to guide a sliding vehicle door along the guide rail;

a drive reel;

at least one flexible force-transmission member passing over the drive reel;

at least one return roller and at least one tension device for tensioning the force-transmission member; and a drive motor unit adapted to be mounted inside a vehicle wall and to be drivingly connected to the drive wheel by a drive shaft passing through a vehicle wall;

wherein a terminal portion of the guide rail is bent in a direction toward a vehicle wall and the return roller is attached to the guide rail at the bend and the roller carriage is arranged so that a point of attachment of the force-transmission member describes a linear path substantially parallel to a main portion of the guide rail during the entire movement of the roller carriage along the guide rail including [its] the terminal portion.

4. A drive arrangement according to claim 3 wherein the force-transmission member is attached to a boom projecting from the roller carriage.

5. A drive arrangement according to claim 4 wherein the boom extends from a terminal portion of the roller carriage which is posterior in relation to the direction of travel of the roller carriage into the bent terminal portion of the guide rail and extends far enough that it is substantially compensates for transverse components of the travel of the roller carriage as it moves into the bent terminal portion of the guide rail.

6. A drive arrangement according to claim 3 wherein the axis of rotation of the return roller extends substantially perpendicular to the vehicle wall.

7. A drive arrangement according to claim 3 wherein the drive reel is a cable drum and the point of attachment is common to two force-transmission cables comprising the force-transmission member and wherein the ends of the two force-transmission cables remote from the roller carriage are attached to the cable drum with opposed directions of winding.

* * * * *